US012164587B2

(12) United States Patent
Chugh et al.

(10) Patent No.: US 12,164,587 B2
(45) Date of Patent: *Dec. 10, 2024

(54) SYSTEMS AND METHODS FOR PRESENTING WEB APPLICATION CONTENT

(71) Applicant: Capital One Services, LLC, McLean, VA (US)

(72) Inventors: Ashwani Chugh, Frisco, TX (US); Karthick Abiraman, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,507

(22) Filed: May 19, 2023

(65) Prior Publication Data

US 2023/0289395 A1 Sep. 14, 2023

Related U.S. Application Data

(63) Continuation of application No. 17/361,489, filed on Jun. 29, 2021, now Pat. No. 11,693,914, which is a (Continued)

(51) Int. Cl.
*G06F 16/957* (2019.01)
*G06F 9/455* (2018.01)
*G06F 40/14* (2020.01)

(52) U.S. Cl.
CPC ........ *G06F 16/957* (2019.01); *G06F 9/45529* (2013.01); *G06F 16/9577* (2019.01); *G06F 40/14* (2020.01)

(58) Field of Classification Search
None
See application file for complete search history.

(56) References Cited

U.S. PATENT DOCUMENTS 6,847,384 B1 1/2005 Sabadell et al.
9,967,309 B2 5/2018 Brown et al.
(Continued)

OTHER PUBLICATIONS

Sengstacke, Peleke, "Babel: JavaScript Transpilers What and Why" available from "https://web.archive.org/web/2017072495630/ https://scotch.io/tutorials/javascript-transpilers-what-they-are-why-we-need-them" pp. 1-9. (Year: 2017).*

(Continued)

*Primary Examiner* — Kyle R Stork
(74) *Attorney, Agent, or Firm* — Bookoff McAndrews, PLLC

(57) ABSTRACT

Methods, systems, and computer-readable medium are disclosed for presenting web application content. For example, a computer-readable medium may include instructions executable by one or more processors to perform operations including: executing a parent application using a web browser, the parent application being a single page application configured to display a web page element in the web browser; identifying a child application requested by a user action; obtaining, from a server system, child application code of the identified child application, the child application code defining a micro-frontend in a first programming language; transpiling the child application code from the first programming language to a second programming language executable by the web browser, to obtain a transpiled child application code renderable by the web browser; and rendering the transpiled child application code so that the micro-frontend is displayed in the web browser.

20 Claims, 6 Drawing Sheets

Related U.S. Application Data continuation of application No. 16/555,971, filed on Aug. 29, 2019, now Pat. No. 11,080,354.

(56) References Cited

U.S. PATENT DOCUMENTS

| | | | |
|---|---|---|---|
| 11,080,354 B2 * | 8/2021 | Chugh | G06F 16/972 |
| 11,119,812 B2 | 9/2021 | Hu et al. | |
| 11,693,914 B2 * | 7/2023 | Chugh | G06F 8/38 |
| | | | 715/234 |
| 2015/0188779 A1 | 7/2015 | McCanne et al. | |
| 2017/0031532 A1 * | 2/2017 | Vasudevan | G06F 9/44 |
| 2017/0034306 A1 * | 2/2017 | Thangeswaran | H04L 67/02 |
| 2018/0081693 A1 | 3/2018 | Burton et al. | |

OTHER PUBLICATIONS

Hung Ho Ngoc, "Single Page Web Application with Restful API and AngularJS: Best Practices with Verto Monitor" (2014), available at https://www.theseus.fi/bitstream/handle/10024/84236/Thesis_SPA.pdf.

Klaus Nygard, Single page architecture as basis for web applications. Aalto University, 2015. Available at https://pdfs.semanticscholar.org/6dd3/a3d02ecda3b52ae4a000e50c565ab41ec0d2.pdf.

Sengstacke, Peleke, "Babel: JavaScript Transpilers What and Why" available from: "https://web.archive.org/web/20170724295630/ https://scotch.io/tutorials/javascript-transpilers-what-they-are-why-we-need-them" pp. 1-9. (Year: 2017).

* cited by examiner

SYSTEMS AND METHODS FOR PRESENTING WEB APPLICATION CONTENT

CROSS-REFERENCE TO RELATED APPLICATION(S)

This patent application is a continuation of and claims the benefit of priority to U.S. Nonprovisional patent application Ser. No. 17/361,489, filed on Jun. 29, 2021, which is a continuation of U.S. Nonprovisional patent application Ser. No. 16/555,971, filed on Aug. 29, 2019, now U.S. Pat. No. 11,080,354, which are incorporated by reference herein in their entireties.

TECHNICAL FIELD

Various embodiments of the present disclosure relate generally to the presentation of web applications and, more particularly, to the presentation of web application frontends using a navigation framework.

BACKGROUND

For websites that include multiple web applications, which may provide different functionalities to a user, it is often desirable to maintain consistency in the look and feel of the website when the user navigates from one web application to another within the website. A common landing portal may provide a common header, footer, sidebar, and/or other interface element to maintain a consistent look and feel. There is a need to implement a navigation framework, usable for such landing portal for example, that permits effective transition between individual web applications. There is also a need for such framework to permit the individual web applications to be developed separately.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for presenting web application content.

For example, a non-transitory computer-readable medium may store instructions that, when executed by one or more processors of a computer system, cause the one or more processors to perform operations for presenting web application content. The operations may include: executing a parent application using a web browser, the parent application being a single page application configured to display a web page element in the web browser; identifying a child application requested by a user action; obtaining, from a server system, child application code of the identified child application, the child application code defining a micro-frontend in a first programming language; transpiling the child application code from the first programming language to a second programming language executable by the web browser, to obtain a transpiled child application code renderable by the web browser; incorporating the transpiled child application code into the web page element; and rendering the transpiled child application code and the web page element using the web browser, so that the micro-frontend is displayed in the web browser as part of the web page element.

Furthermore, a non-transitory computer-readable medium may store instructions that, when executed by one or more processors of a computer system, cause the one or more processors to perform operations for presenting web application content. The operations may include: executing a parent application using a web browser, the parent application being a single page application configured to display a web page element in the web browser, the parent application including a registered correspondence between a plurality of child applications and a plurality of child application identifiers; upon detection, by the web browser, of a user command indicative of a first child application identifier, identifying, from the plurality of child applications, a first child application corresponding to the first child application identifier based on the registered correspondence; transpiling child application code of the first child application from a first programming language to a second programming language executable by the web browser, to obtain a transpiled child application code; incorporating the transpiled child application code into the web page element; and rendering the transpiled child application code and the web page element using the web browser, so that a micro-frontend is displayed in the web browser as part of the web page element.

Furthermore, a computer system may include: a memory storing instructions; and one or more processors configured to execute the instructions to perform operations. The operations may include: receiving, from a client device, a page load request; transmitting, to the client device, a parent application, the parent application being a single page application executable in a web browser of the client device, wherein the parent application, when executed in the web browser of the client device, configures the client device to identify a child application when the child application is requested by user action performed by a user of the web browser; receiving, from the client device, an asynchronous request requesting a child application code of the child application; and transmitting, to the client device, the child application code. The parent application, when executed in the web browser of the client device, further configures the client device to: use a transpiler to transpile the child application code from a first programming language to a second programming language executable by the web browser, to obtain a transpiled child application code renderable by the web browser, the transpiled child application code defining a micro-frontend; and incorporate the child application code into a web page element of the parent application so that the micro-frontend is displayed in the web browser as part of the web page element.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, based on a user command to access a particular web application, a parent application running in a web browser may retrieve code for the web application, and transpile the retrieved code so that it is displayable by the web browser. The parent application may implement a navigation framework by which the user may access different web applications, which in this context may be referred to as child applications. Because the parent application transpiles the code of a child application, child applications may be independently developed in different programming languages.

Figure 1:
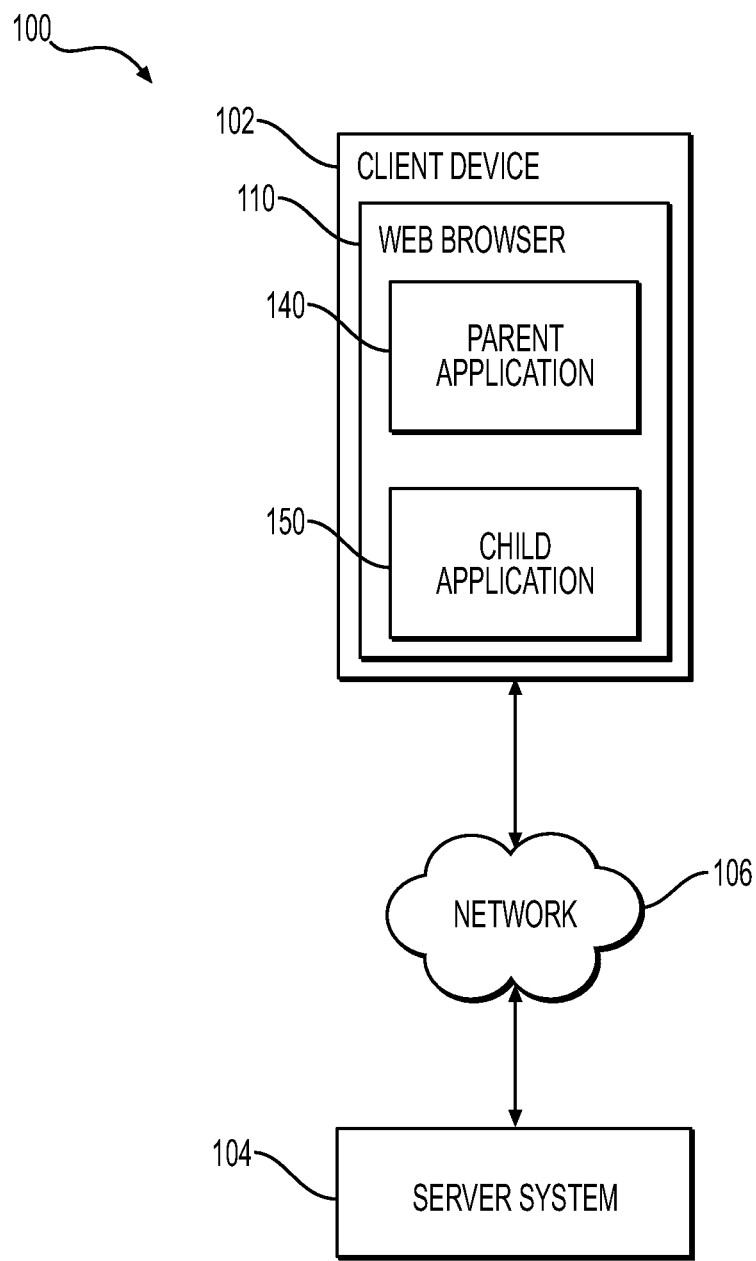
FIG. 1 depicts an exemplary system infrastructure for presenting web application content, according to one or more embodiments.

FIG. 1 illustrates a system infrastructure 100 for presenting web application content, according to one or more embodiments of the present disclosure. System infrastructure 100 may include a client device 102 and a server system 104. Client device 102 and server system 104 may communicate with each other through a communication network 106.

Client device 102 may execute a web browser 110 in which web applications can be run. Web browser 110 may be said to be running a web application if it runs the client-side component elements of the web application, even if the web application includes, utilizes, or otherwise involves server-side elements that are run on server system 104. In this disclosure, the term "run" is used interchangeably with "execute."

Web browser 110 may run web applications provided by server system 104. Such web applications may include a parent application 140 and a child application 150, as shown in FIG. 1. As will be discussed in more detail below, parent application 140 may provide functionalities for web content navigation, and may display the frontend of child application 150 based on a user command received by the web browser 110.

Server system 104 may store parent application 140, child application 150, and other child applications in a memory of the server system 104. Server system 104 may provide such web applications to client device 102 upon receiving a request from client device 102. For example, server system 104 may execute a web server, which may receive a request sent by web browser 110 to access a particular web application. Upon receiving the request, the web server may invoke an appropriate web application server that services that particular web application. The web server may retrieve, from the web application server, data that is to be provided to web browser 110. Such data may include computer code (e.g., HTML, CSS, JavaScript, and/or media content) that is executable by the web browser 110 to run the client-side components of the web application. The web server may also provide data that is used by the web application when the web application is running in web browser 110.

Client device 102 may be any suitable computer system. For example, client device 102 may be a desktop or laptop personal computer, or a mobile computing device such as a smartphone, tablet, or wearable computing device. Similarly, server system 104 may be any suitable computer system. For example, server system 104 may have a cloud-computing platform having scalable resources for computation and/or data storage, and may perform any of the functionalities of the server system 104 on the cloud computing platform. Communications network 106 may be, for example, the Internet, or a combination of private and/or public network(s).

Figure 2:
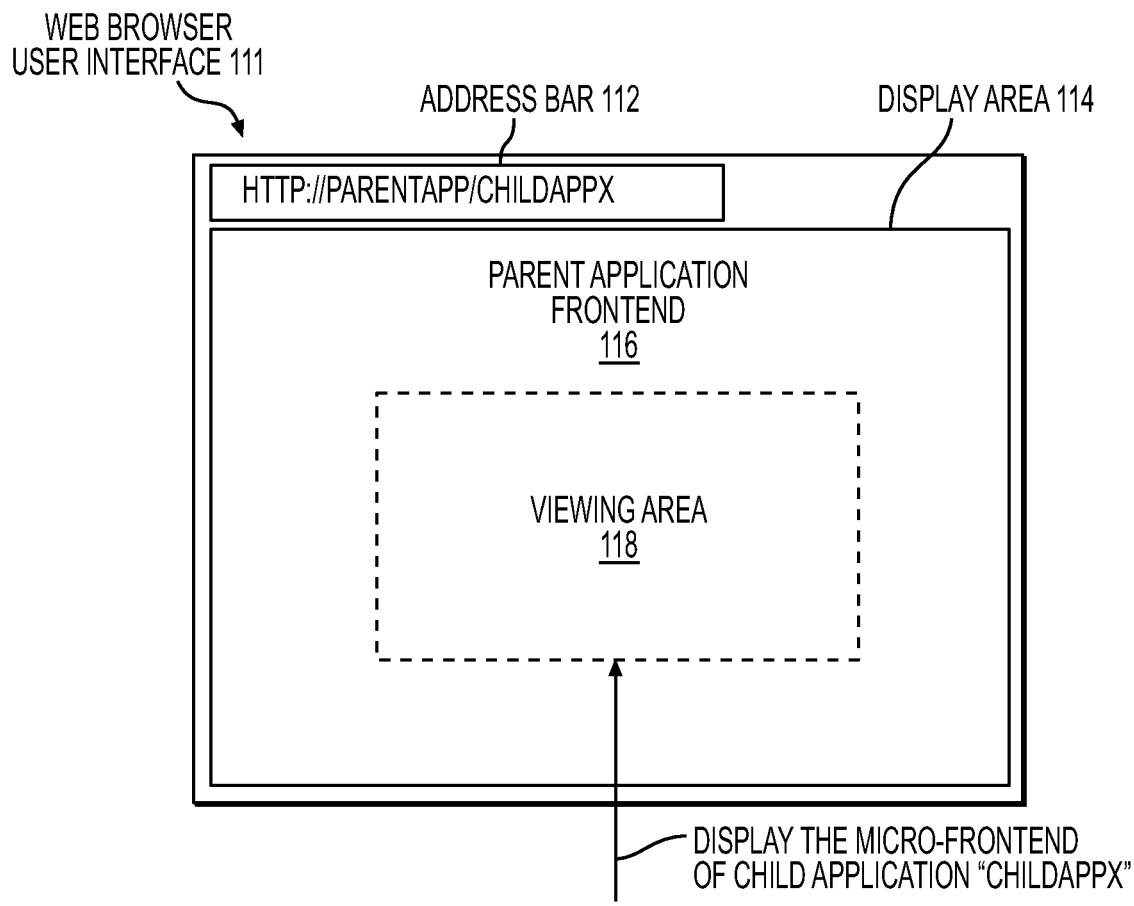
FIG. 2 illustrates a web browser interface and the presentation of content in the web browser interface, according to one or more embodiments.
Figure 2:
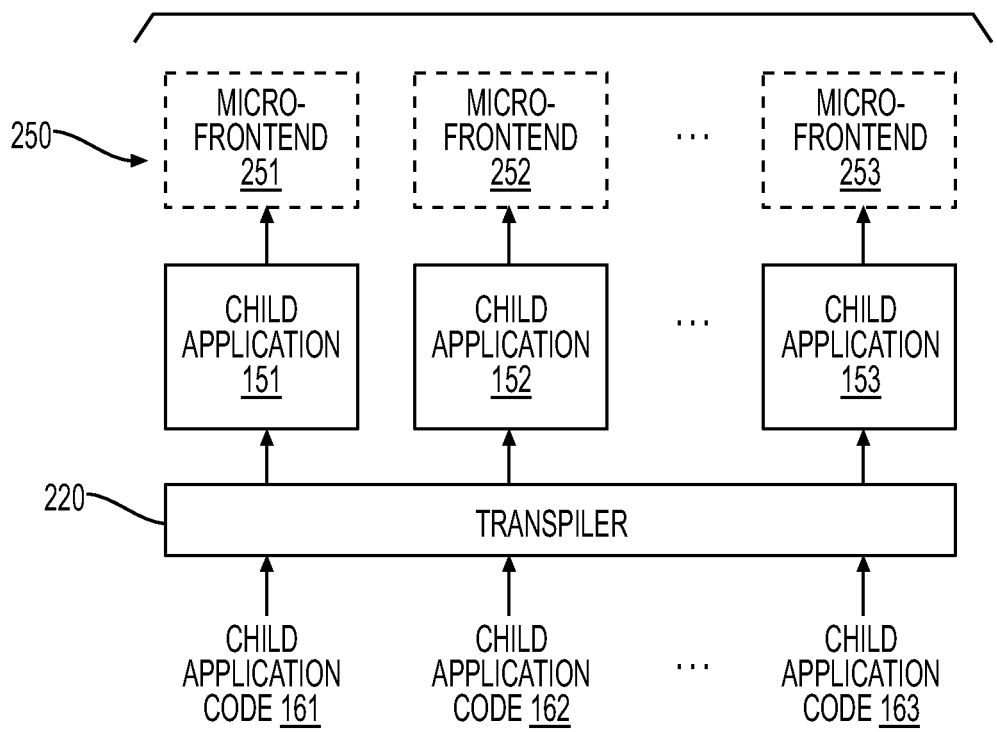

FIG. 2 illustrates a web browser user interface 111 of web browser 110, and the presentation of content in the web browser user interface 111. As shown, web browser user interface 111 may include an address bar 112 and a display area 114. Web browser interface 111 may be presented as a screen that is displayed on an electronic display (e.g., a monitor or touchscreen) of client device 102. Display area 114 may display contents of a web application or other website loaded in web browser 110. Web browser interface 111 may have additional user interface elements, such as a back button, a forward button, a refresh button, a search bar, and/or a menu bar; however, such elements are omitted from the figure for purposes of clarity.

When run in web browser 110, parent application 140 may display a parent application frontend 116 in display area 114. Parent application 140 may be a single page application. For example, after providing an initial web page document to the web browser 110 in response to a page load request received from the web browser 110, parent application frontend 116 may be updated dynamically without requiring the web browser 110 to load an entirely new page. The dynamic update of the parent application frontend 116 may be performed using, for example, Asynchronous JavaScript and XML (AJAX) and/or other JavaScript-based techniques.

Parent application frontend 116 may include a viewing area 118 in which content displayed by web browser 110 is updated by the parent application 140. For example, parent application 140 may display one of a plurality of micro-frontends 250 on the web browser 110's display area 114. In the single page application architecture described above, the parent application 140 may replace the micro-frontend 250 that is currently being displayed in viewing area 118 with another one (e.g., a different one) of the plurality of micro-frontends 250, in response to a user interaction with the web browser 110 or the parent application 140. It is noted that viewing area 118 may have any suitable shape or layout, and may have any suitable position with respect to other portions of the parent application frontend 116. That is, viewing area 118 is not limited to being at the center of parent application frontend 116 as instantly shown in FIG. 2 for purposes of illustration only. Viewing area 118 may be defined by a web page element, such as a Document Object Model (DOM) element of the parent application frontend 116.

The plurality of micro-frontends 250 may each be a frontend of a respective child application. For example, as shown in FIG. 2, the plurality of micro-frontends may include micro-frontends 251, 252, and 253, which may be frontends of child applications 151, 152, and 153, respectively. Each of the plurality of child applications 151, 152, and 153 may be loaded from server system 104, and any one of which may serve as an example of child application 150 described above in connection with FIG. 1. The plurality of child applications 151, 152, and 153 may respectively provide micro-frontends 251, 252, and 253, any one of which may be displayed in the viewing area 118 of the parent application frontend 116.

In general, a frontend, such as parent application frontend 116 and any of the micro-frontends 250, may include any suitable content, such as text, images, videos and/or other media. A frontend may include interactive elements (e.g., clickable links or other interactive graphical user interface elements), which may respond to user-interaction events detected by the web browser 110, such as mouse events (e.g., mouse clicks, mouse movement, etc.). Interactive elements may include, for example, elements that a user may interact with to trigger a request (e.g., an AJAX request) that is sent by the web browser 110 to the server system 104. An application, such as parent application 140 or any of the plurality of child applications 151, 152, and 153, may provide a frontend by, for example, defining the frontend and instructing web browser 110 to display the frontend when the respective child application is executed by web browser 110.

The particular content of a frontend may depend on the purpose of the application providing the frontend. In some embodiments, parent application 140 may be a portal application, in which case the parent application frontend 116 may have portal application functionalities for navigating between pages and/or web application functionalities. For example, the parent application 140 and child applications 151, 152, and 153 may collectively constitute a website. In the instant example, micro-frontends 251, 252, and 253 provided by child applications 151, 152, and 153, respectively, may be different sections of the website (e.g., different sections with different user interaction functionalities), and parent application frontend 116 may include an interface by which the user may navigate between the different sections. Parent application frontend 116 may include common website layout components that are viewed regardless of which of the different sections is being displayed. For example, parent application frontend 116 outside of viewing areas 118 may include a header, footer, sidebar, and/or other web page layout element that is commonly displayed regardless of which child application is being displayed in viewing area 118.

Parent application 140 may determine a particular micro-frontend 250 to be displayed in viewing area 118 in web browser 110 based on an identifier received from the web browser 110. Such an identifier may be a URL indicative of both parent application 140 and a particular child application 150. Such a URL is represented in FIG. 2 by the expression "http://parentapp/childappx", where "parentapp" represents a hostname or other identifier of parent application 140, and "childappx" represents an identifier of a particular child application 150 requested by the user to be displayed in web browser 110. That is, a portion of the URL may include an identifier of a particular child application.

The hostname may be in any suitable format, such as "www.parentapp.com". The child application identifier may be in any suitable format. In the example shown in FIG. 2, the child application identifier is a set of characters following a forward slash. In other examples, the child application identifier may include a URL fragment preceded by a hash tag (#) symbol (e.g., "#childapp1" for one of the child applications 151, 152, and 153 and "#childapp2" for another one of the child applications 151, 152 and 153).

When the user operates web browser 110 to navigate to the aforementioned URL (e.g., by activating a link or typing the URL into the address bar 112), if the parent application 140 indicated by the URL has not yet been loaded in the web browser 110, web browser 110 may transmit a page load request to server system 104. Server system 104 may then provide the parent application 140 to be loaded in web browser 110. If the parent application 140 indicated by the URL has already been loaded in web browser 110, the parent application may receive the URL when user operates web browser 110 to navigate to the URL.

When parent application 140 has been loaded in web browser 110, parent application 140 may read the URL to determine, based on the child application identifier indicated by the URL, the particular child application 150 corresponding to the child application identifier. The corresponding micro-frontend 250 of the determined child application 150 may then displayed in viewing area 118. For example, if the child application identifier corresponds to child application 151, then the parent application 140 may display micro-frontend 251 in viewing area 118. If the identifier instead corresponds to child application 152, then the parent application 140 may display micro-frontend 252 in viewing area 118. Parent application 140 may display a micro-frontend by appending code (e.g., a set of DOM elements), used to render the micro-frontend, as a child element of layout elements that form the viewing area 118, such that the micro-frontend is included as part of the parent application frontend 116. Parent application 140 may be configured to display the micro-frontend 250 of only one child application 150 in viewing area 118, in which case parent application 140 may remove an existing micro-frontend (e.g., a presently displayed micro-frontend) and replace it with the micro-frontend of the child application whose micro-frontend is to be displayed (e.g., the micro-frontend corresponding to the requested/determined child application 150).

In order for parent application 140 to display the micro-frontend corresponding to a particular child application, server system 104 may provide executable code that is usable by client device 102 to render the micro-frontend. In general, the executable code for any child application that is serviced by the server system 104 may be loaded onto the client device 102 at any suitable time. For example, it is possible for all of the plurality of the child applications 151, 152, and 153 to be loaded onto the client device 102 during the initial page load. In this case, when one of the micro-frontends 251, 252 or 253 is to be displayed in the viewing area 118, the parent application 140 may display the micro-frontend without having to retrieve the corresponding child application from server system 104.

It is also possible that not all of the child applications 151, 152, and 153 are loaded in the initial page load. In this case, if a child application has been requested for display of its micro-frontend but the child application has not yet been loaded onto client device 102, then parent application 140 may request the child application to be loaded from server system 104. For example, parent application 140 may transmit a request to server system 104 to request the child application. Such a request may be an AJAX request, and access the child application at an actual address of the child application. In this context, the actual address of the child application may be a URL, served by server system 104, at which the child application is accessible. The actual address may be an address (e.g., URL) that is different from the URL displayed in the address bar 112 of the web browser 110. That is, the URL displayed in the address bar 112 may include a child application identifier, as discussed above, but this URL is not necessarily the web address at which the child application is accessible over network 106.

Parent application 140 may identify and request a particular child application based on a correspondence between the child application identifier of the child application and the actual address of the child application. This correspondence may be known to parent application 140 (e.g., specified in the code of parent application 140). In some embodiments, the actual address of the child application may be registered with the child application identifier, in which case the actual address may be referred to as a registered address or a registered route.

For example, when the user of web browser 110 types in and submits an URL of parent application 140 appended by the identifier of the child application (e.g., "http://parentapp/childapp1"), parent application 140 may route the page request to the registered address of child application, based on a correspondence between the identifier (e.g., "childapp1") and the registered address of the child application. Parent application 140 may then append the micro-frontend of the retrieved child application in its DOM as child element of viewing area 118. In doing so, parent application 140 may remove any existing (e.g., presently displayed) micro-frontend associated with another child application.

Server system 104 may transmit child applications 151, 152, and 153 to client device 102 in the form of child application code 161, 162 and 163, respectively. In some embodiments, child application code 161, 162, 163 may be computer code written in a first programming language that is not necessarily executable by the web browser 110. Therefore, parent application 140, upon receiving child application code 161, 162, 163, may translate the computer code of the micro-frontend data from the first programming language into a second programming language different from the first programming language, wherein the second programming language is executable by the web browser 110. Such translation may take the form of a transpiling operation, and may be performed by transpiler 220.

Transpiler 220 may be any suitable transpiler, such as a Babel transpiler. Transpiler 220 may a client-side component that is loaded from server system 104 and executed by web browser 110. Transpiler 220 may be part of parent application 140 or as a component separate from parent application 140.

Since micro-frontend code 161, 162, and 163 do not need to be executable by the web browser 110, the first programming language may be variable depending on how the child applications are developed. In some examples, the first programming language may be ECMAScript. The second programming language may be any suitable programming language that is executable by web browser 110. In some embodiments, the second programming language may be a version of JavaScript that is executable by web browser 110.

Server system 104 may be configured to provide services for user-interaction functionalities of the respective micro-frontend, such as the processing (e.g., creating, reading, updating and/or deleting) of data according to user interactions input through the micro-frontend. For example, a user of the web browser 110 that is using micro-frontend 251 may trigger an action resulting in an AJAX request being transferred from the web browser 110 to server system 104. The content of the AJAX request may be provided to the appropriate child application 150. For example, if the user uses a functionality of micro-frontend 251 that is serviced by child application 151, the content of the AJAX request may be provided to child application 151 servicing the functionality.

In some embodiments, parent application 140 may be, for example, a portal application that provides a navigation framework to permit navigation to and between any number of child applications (e.g., child applications 151, 152, and 153). The parent application 140 may be developed in Angular (e.g., Angular 6), for example, and may utilize a navigation framework library to register child applications.

The navigation framework library may be a JavaScript library that includes a single page application framework such as Single SPA (also known as "single-spa") and/or other JavaScript frameworks such as Angular 6 and Webpack. This navigation framework library may enable parent application 140 (and any JavaScript based application, in general) to register as a child application of parent application 140, as further described below in connection with FIG. 3.

Each child application 150 may be developed and deployed independently and may be served on-demand as a micro-frontend. For example, each child application 150 may be developed using any JavaScript based stack for development. In some embodiments, the child applications 150 may be developed using Angular (e.g., Angular 2), React, Vue, or other framework. For example, child application 151, 152, and 153 may be an Angular application, a React application, and a Vue application, respectively.

By the techniques discussed above, each child application may be developed independently and served on-demand as a micro-frontend. Since parent application 140 may have a single page application architecture, as described above, parent application 140 does not need to be reloaded upon changing the child application that is displayed in viewing area 118.

Figure 3:
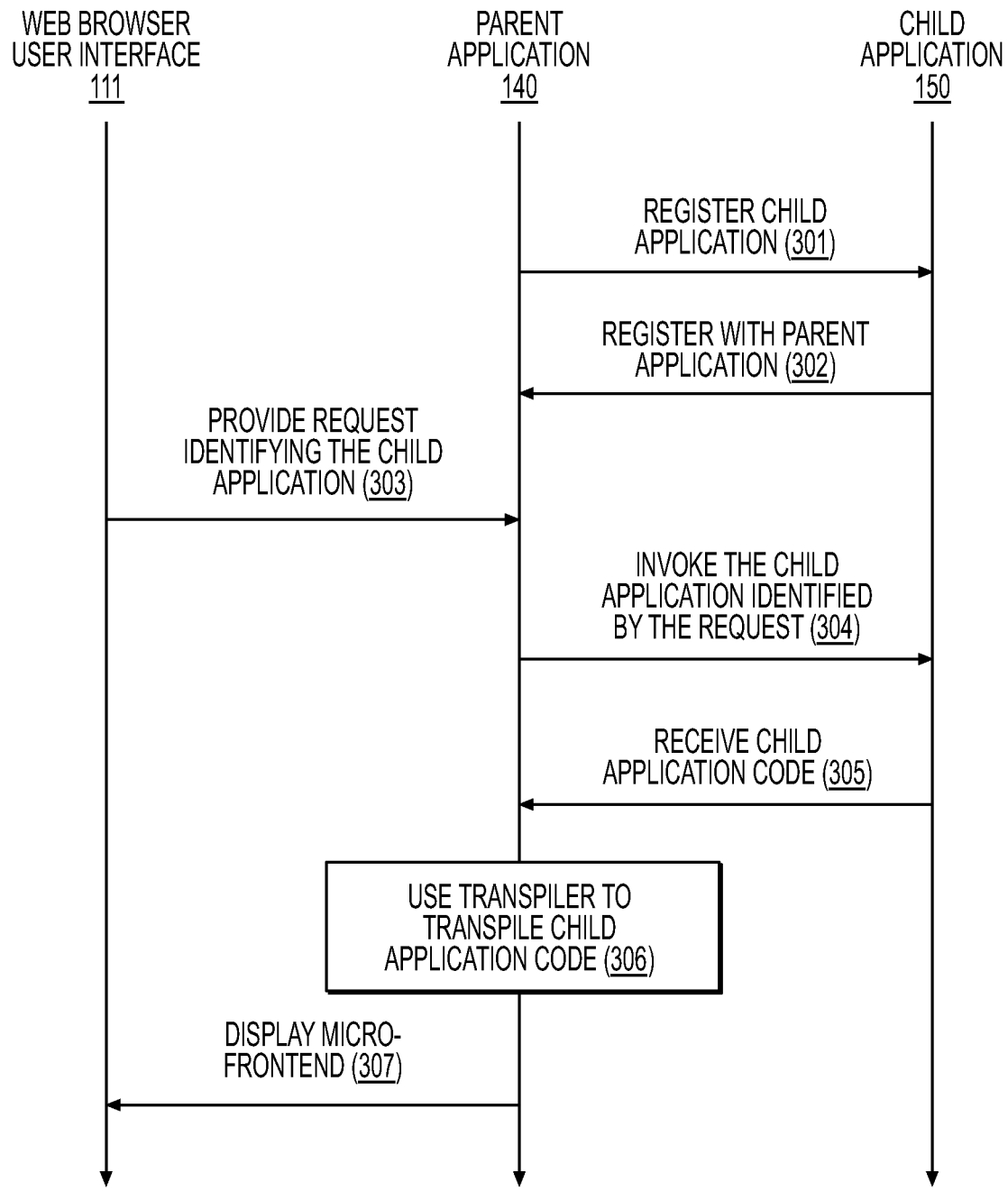
FIG. 3 is a sequence diagram illustrating interactions between a web browser user interface, a parent application, and a child application, according to one or more embodiments.

FIG. 3 is a sequence diagram illustrating interactions between web browser user interface 111, parent application 140, and child application 150. Child application 150 may be, for example, any one of the child applications 151, 152, and 153 described above.

In step 301, parent application 140 may register child application 150. In this step, parent application 140 may utilize a navigation framework library, as described above, to register child application 150. The navigation framework library may include a set of resources (e.g., a child application registration function) used to perform the registration. Parent application 140 may specify a identifier, child application address, name, and/or child HTML tag for child application 150. For example, to register child application 150, parent application 140 may invoke the child application registration function of the navigation framework library such that the specified identifier, child application address, name, and/or child HTML tag are associated with (e.g., stored in memory in association with) child application 150. The child application address may be the actual address of the child application 150, as described above in relation to FIG. 2.

In step 302, child application 150 may utilize the navigation framework library to register with the parent application 140, so that child application 150 is mountable to parent application 140. In this step, the child application 150 may specify the child HTML tag specified by the parent application 140. Steps 301 and 302 may result in the parent application 140 and the child application 150 registering with one another, such that the parent application 140 and child application 150 may identify and/or communicate with one another.

It is noted that steps 301 and 302 may be repeated for other child applications. The registration process of steps 301 and 302 may be performed for a plurality of child applications, such that the parent application 140 is able to display any one of the plurality of registered child applications.

In step 303, web browser user interface 111 may provide a request identifying a particular child application. The identified child application may be child application 150. Step 303 may be performed as described above in connection with FIG. 2. For example, the user may input a URL that includes an identifier of child application 150.

In step 304, parent application 140 may invoke the child application identified by the request. For example, parent application 140 may detect a child application identifier specified by the URL input by the user, and transmit an AJAX request to the actual address of child application 150.

In step 305, parent application 140 may receive the child application code. In step 306, parent application 140 may use a transpiler (e.g., transpiler 220) to transpile the child application code. In step 307, the parent application 140 may display the micro-frontend of the child application 150 in web browser user interface 111. Steps 305, 306 and 307 may be performed as described above in connection with FIG. 2.

Figure 4:
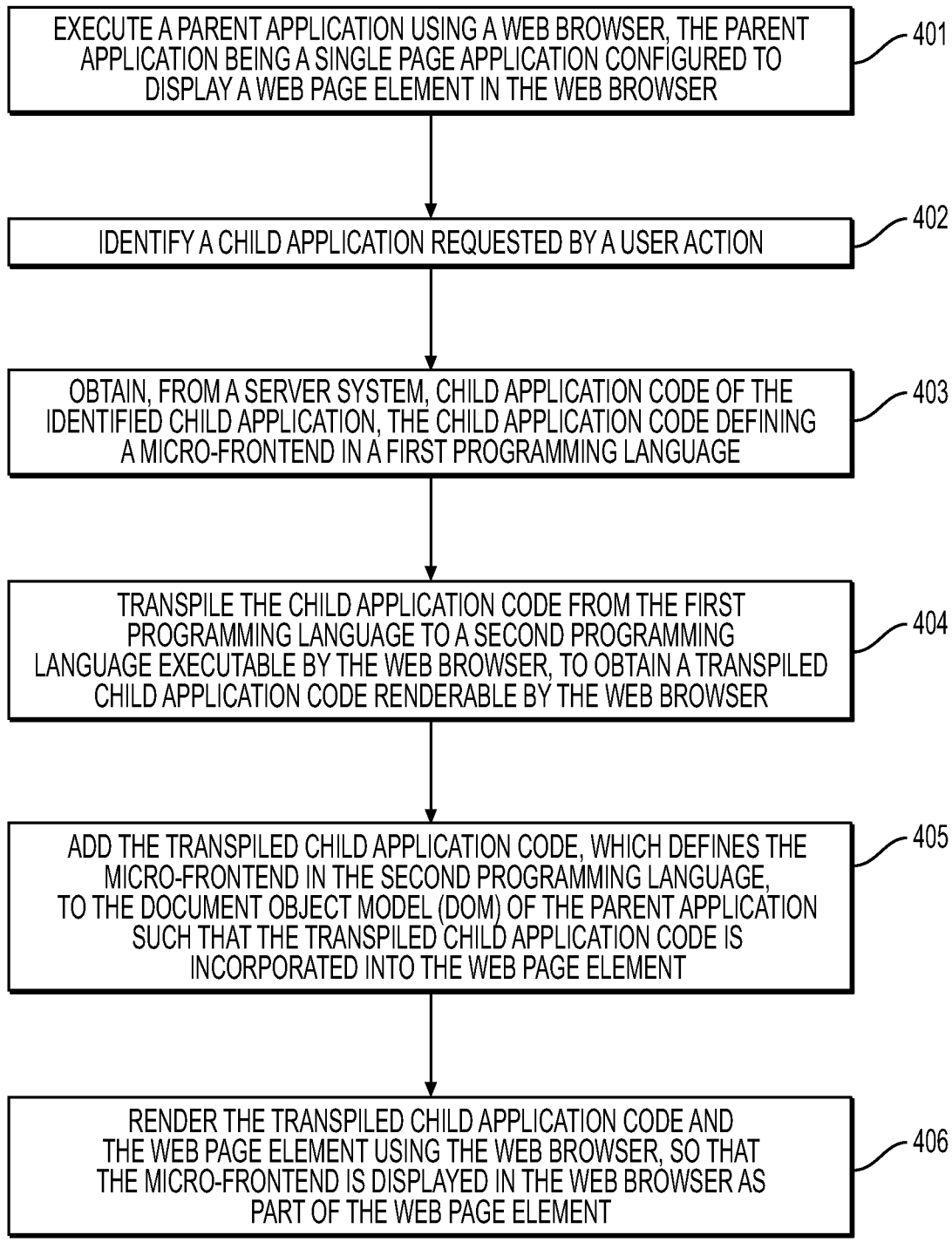
FIG. 4 is a flowchart illustrating a method for presenting web application content, according to one or more embodiments.

FIG. 4 is a flowchart illustrating a method for presenting web application content. The method may be performed by client device 102. In some embodiments, client device 102 may be configured to perform the method by executing instructions. Such instructions may be stored in any suitable computer-readable medium. The method illustrated by FIG. 4 may incorporate any of the techniques and methodologies discussed above in connection with FIGS. 1-3, where context permits.

Step 401 may include executing a parent application using a web browser, the parent application being a single page application configured to display a web page element in the web browser. The parent application, web browser, and web page element in the method illustrated by FIG. 4 may respectively be parent application 140, web browser 110, and a web page element that is displayed in viewing area 118, as described above in connection with FIGS. 1-3.

Step 402 may include identifying a child application requested by a user action. The child application may be child application 150, as described above in connection with FIGS. 1-3. For example, the user action may be indicative of a URL including a child application identifier that identifies child application 150, and may be a command to navigate the web browser 110 to the URL. Identification of the child application 150 may include identifying the child application 150 based on the child application identifier.

The correspondence between child application 150 and the child application identifier may be known to the parent application 140. In some embodiments, the parent application 140, executed using the web browser 110, may include a registered correspondence between a plurality of child applications 150 and a plurality of child application identifiers. In such embodiments, step 402 may include identifying, from the plurality of child applications 150, a particular child application corresponding to the child application identifier indicated by the URL.

Step 403 may include obtaining, from a server system (e.g., server system 104), child application code of the identified child application, the child application code defining a micro-frontend in a first programming language. For example, the child application code may be obtained by determining a child application URL corresponding to the child application 150 based on the child application identifier, and sending, to the child application URL, an asynchronous request requesting the child application code. To obtain the child application code, the parent application 140 may utilize a single page application framework and route a page request associated with the URL of step 402, to the child application URL. The child application ULR may be the actual address of the child application at which the child application may be retrieved from server system 104.

Step 404 may include transpiling the child application code from the first programming language to a second programming language executable by the web browser 110, to obtain a transpiled child application code renderable by the web browser 110. For example, the first programming language may be an ECMAScript-based language, and the second programming language may be a version of JavaScript executable by the web browser 110.

Step 405 may include adding the transpiled child application code, which defines the micro-frontend in the second programming language, to the document object model (DOM) of the parent application such that the transpiled child application code is incorporated into the web page element. For example, parent application 140 may append the transpiled child application code into the parent application frontend 116 as a child element of the DOM element corresponding to viewing area 118. In doing so, the parent application 140 may remove any existing (e.g., previously displayed) child application code of another child application.

Step 406 may include rendering the transpiled child application code and the web page element using the web browser 110, so that the micro-frontend is displayed in the web browser 110 as part of the web page element.

Figure 5:
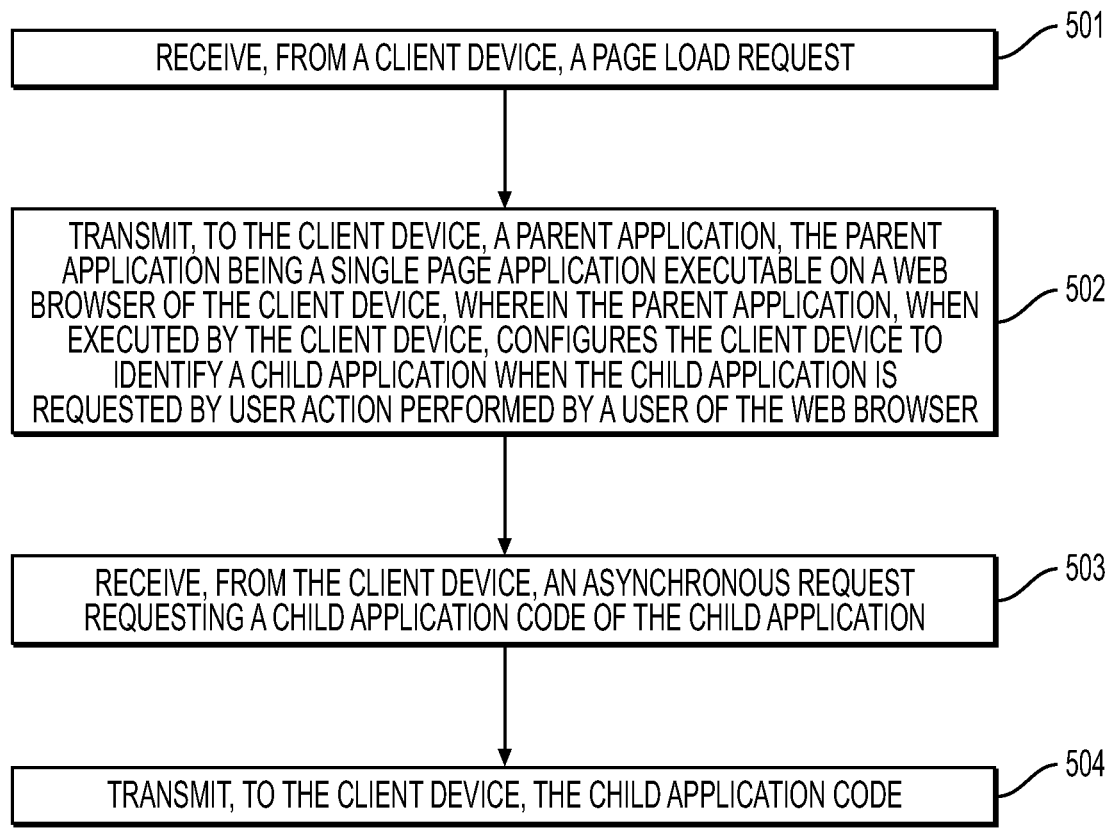
FIG. 5 is a flowchart illustrating another method for presenting web application content, according to one or more embodiments

FIG. 5 is a flowchart illustrating a method for presenting web application content. The method may be performed by server system 104. In some embodiments, client device 102 may be configured to perform the method by executing instructions. Such instructions may be stored in any suitable computer-readable medium.

Step 501 may include receiving, from a client device, a page load request. The client device may be client device 102, described above.

Step 502 may include transmitting, to the client device 102, a parent application. The parent application may be parent application 140 described above. As described, parent application 140 may be a single page application executable in web browser 110 of client device 102. The parent application 140, when executed in web browser 110, may configure the client device 102 to identify a child application (e.g., child application 150) when the child application is requested by user action performed by a user of the web browser 110.

Step 503 may include receiving, from the client device 102, an asynchronous request requesting a child application code of the child application.

Step 504 may include 504 transmitting, to the client device 102, the child application code. As described above in connection with FIG. 2, the parent application 140, when executed in web browser 110, may configure client device 102 to use a transpiler (e.g., transpiler 220) to transpile the child application code from a first programming language to a second programming language executable by the web browser 110, to obtain a transpiled child application code renderable by the web browser 110; and incorporate the child application code into a web page element of the parent application 140 so that a micro-frontend defined by the transpiled child application code is displayed in the web browser 110 as part of the web page element.

It is noted that, in general, the methods illustrated by FIGS. 4 and 5 may incorporate any of the techniques and methodologies discussed above in connection with FIGS. 1-3, wherever context permits.

According to the techniques described in this disclosure, parent application 140 may be implemented as a portal application that enables the display of multiple web applications without moving away from the parent application. Parent application 140 permits various child applications to be presented, wherein such child applications may provide different functionalities to a user and may be developed independently and served on-demand as a micro-frontend. Parent application 140, when implemented as a single page application, does not need to be reloaded upon changing the micro-frontend that is displayed in the web browser 110.

It is noted that while parent application 140 and child application 150 are referred to as web applications in various embodiments, the teachings herein may also be applied to other types of applications. Therefore, parent application 140 and child application 150 may, in general, also be referred to as applications that run on client device 102.

In general, any method discussed in this disclosure that is understood to be computer-implementable, such as the methods described in connection with FIGS. 4-5, may be performed by one or more processors of a computer system, such as client device 102 and/or server system 104, as described above. A method or method step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as client device 102 and/or server system 104, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 6:
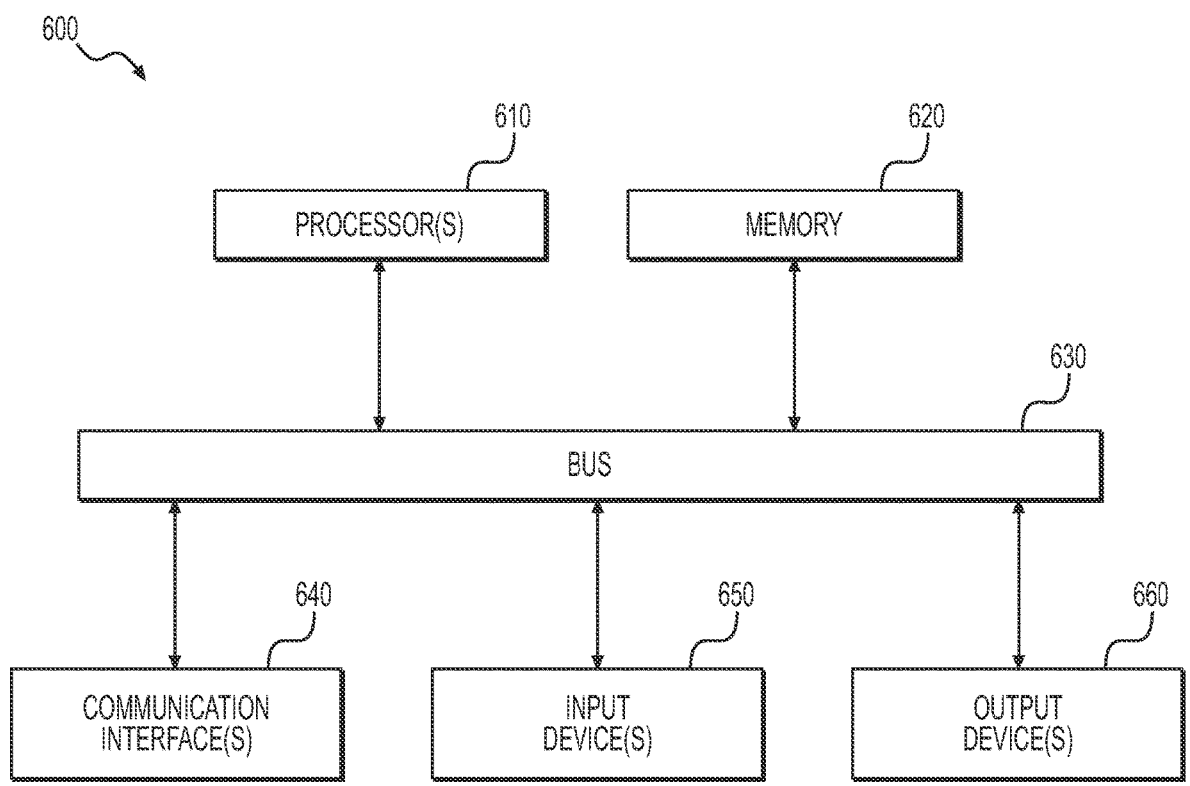
FIG. 6 illustrates a computing device, according to one or more embodiments.

FIG. 6 illustrates an example of a computing device 600 of a computer system. The computing device 600 may include processor(s) 610 (e.g., CPU, GPU, or other processing unit), a memory 620, and communication interface(s) 640 (e.g., a network interface) to communicate with other devices. Memory 620 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 620. The computing device 600 may, in some embodiments, further include input device(s) 650 (e.g., a keyboard, mouse, or touchscreen) and output device(s) 660 (e.g., a display, printer). The aforementioned elements of the computing device 600 may be connected to one another through a bus 630, which represents one or more busses.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for presenting web application content, the computer-implemented method comprising:
    executing a parent application of a website in a web browser, wherein the parent application is a single page application configured to display a web page element and an interface enabling navigation among a plurality of child applications of the website corresponding to a plurality of different sections of the website, and wherein first code of a first child application of the plurality of child applications corresponding to a first section of the website and defining a first micro-frontend associated with a first functionality is integrated in an architecture of the single page application, causing the first micro-frontend to be presently displayed in the web browser as part of the web page element;
    receiving a request, via the interface of the parent application, to navigate from the first child application to a second child application of the plurality of child applications corresponding to a second section of the website;
    obtaining second code of the second child application defining a second micro-frontend associated with a second functionality different from the first functionality;
    replacing the first code with the second code in the architecture of the single page application; and
    rendering the second code and the web page element in the web browser such that the second micro-frontend is displayed in the web browser as part of the web page element.

2. The computer-implemented method of claim 1, further comprising:
    transforming the second code from a first programming language to a second programming language different than the first programming language, wherein the second programming language is executable by the web browser.

3. The computer-implemented method of claim 1, wherein the request is received based on a user action and is indicative of a uniform resource locator (URL) including an identifier of the second child application.

4. The computer-implemented method of claim 3, wherein obtaining the second code includes:
    based on the identifier, determining a second child application URL corresponding to the second child application; and
    sending, to the second child application URL, an asynchronous request requesting the second code.

5. The computer-implemented method of claim 1, wherein, within the architecture of the single page application, the first code is appended as a child element of the web page element, and replacing the first code with the second code comprises:
    removing the first code; and
    appending the second code as the child element of the web page element.

6. The computer-implemented method of claim 5, wherein the web page element of the parent application includes one or more layout elements, the first code is appended as a child element of the one or more layout elements, and replacing the first code with the second code comprises:
    removing the first code; and
    appending the second code as the child element of the one or more layout elements.

7. The computer-implemented method of claim 1, wherein the parent application of the website is executed in the web browser in response to receiving a request to access the first child application via the web browser.

8. The computer-implemented method of claim 1, wherein the web page element is a document object model (DOM) element of the parent application.

9. The computer-implemented method of claim 1, wherein, within the architecture of the single page application, the first code is included in a document object model (DOM) element of the parent application, and replacing the first code with the second code comprises replacing the first code with the second code in the DOM element.

10. The computer-implemented method of claim 1, wherein the parent application includes one or more shared interface components for each of the plurality of child applications.

11. A computing device for presenting web application content, the computing device comprising:
    at least one memory storing instructions; and
    at least one processor operatively connected to the at least one memory and configured to execute the instructions to perform operations, comprising:
        executing a parent application of a website in a web browser, wherein the parent application is a single page application configured to display a web page element and an interface enabling navigation among a plurality of child applications of the website corresponding to a plurality of different sections of the website, and wherein first code of a first child application of the plurality of child applications corresponding to a first section of the website and defining a first micro-frontend associated with a first functionality is integrated in an architecture of the single page application, causing the first micro-frontend to be presently displayed in the web browser as part of the web page element;
        receiving a request, via the interface of the parent application, to navigate from the first child application to a second child application of the plurality of child applications corresponding to a second section of the website;

obtaining second code of the second child application defining a second micro-frontend associated with a second functionality different from the first functionality;

replacing the first code with the second code in the architecture of the single page application; and rendering the second code and the web page element in the web browser such that the second micro-frontend is displayed in the web browser as part of the web page element.

12. The computing device of claim 11, the operations further comprising:

transforming the second code from a first programming language to a second programming language different than the first programming language, wherein the second programming language is executable by the web browser.

13. The computing device of claim 11, wherein the request is received based on a user action and is indicative of a uniform resource locator (URL) including an identifier of the second child application.

14. The computing device of claim 13, wherein obtaining the second code includes:

based on the identifier, determining a second child application URL corresponding to the second child application; and sending, to the second child application URL, an asynchronous request requesting the second code.

15. The computing device of claim 11, wherein, within the architecture of the single page application, the first code is appended as a child element of the web page element, and replacing the first code with the second code comprises:

removing the first code; and appending the second code as the child element of the web page element.

16. The computing device of claim 15, wherein the web page element of the parent application includes one or more layout elements, the first code is appended as a child element of the one or more layout elements, and replacing the first code with the second code comprises:

removing the first code; and appending the second code as the child element of the one or more layout elements.

17. The computing device of claim 11, wherein the parent application of the website is executed in the web browser in response to receiving a request to access the first child application.

18. The computing device of claim 11, wherein the web page element is a document object model (DOM) element of the parent application.

19. The computing device of claim 11, wherein the parent application includes one or more shared interface components for each of the plurality of child applications.

20. A non-transitory computer-readable medium storing instructions for presenting web application content, the instructions, when executed by one or more processors, causing the one or more processors to perform operations comprising:

executing a parent application of a website in a web browser, wherein the parent application is a single page application configured to display a web page element and an interface enabling navigation among a plurality of child applications of the website corresponding to a plurality of different sections of the website, and wherein first code of a first child application of the plurality of child applications corresponding to a first section of the website and defining a first micro-frontend associated with a first functionality is integrated in an architecture of the single page application, causing the first micro-frontend to be presently displayed in the web browser as part of the web page element;

receiving a request, via the interface of the parent application, to navigate from the first child application to a second child application of the plurality of child applications corresponding to a second section of the website;

obtaining second code of the second child application defining a second micro-frontend associated with a second functionality different from the first functionality;

replacing the first code with the second code in the architecture of the single page application; and rendering the second code and the web page element in the web browser such that the second micro-frontend is displayed in the web browser as part of the web page element.

* * * * *